(12) United States Patent
Schmitt et al.

(10) Patent No.: US 12,199,296 B2
(45) Date of Patent: Jan. 14, 2025

(54) BATTERY MODULE

(71) Applicant: Robert Bosch GmbH, Stuttgart (DE)

(72) Inventors: Markus Schmitt, Tamm (DE); Alexander Foitzik, Stuttgart (DE); Christian Boehnlein, Arberg (DE); Lars Liebscher, Hoerselberg-Hainich Ot Wenigen (DE); Ralph Glemser, Brackenheim (DE); Robert Kohler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 17/722,636

(22) Filed: Apr. 18, 2022

(65) Prior Publication Data
US 2022/0336899 A1 Oct. 20, 2022

(30) Foreign Application Priority Data

Apr. 19, 2021 (DE) .......................... 102021109759.2

(51) Int. Cl.
*H01M 50/207* (2021.01)
*H01M 50/218* (2021.01)
*H01M 50/224* (2021.01)
*H01M 50/262* (2021.01)

(52) U.S. Cl.
CPC ....... *H01M 50/207* (2021.01); *H01M 50/218* (2021.01); *H01M 50/224* (2021.01); *H01M 50/262* (2021.01)

(58) Field of Classification Search
CPC ............. H01M 50/204; H01M 50/207; H01M 50/244; H01M 50/262; H01M 50/224; H01M 50/276
See application file for complete search history.

(56) References Cited

U.S. PATENT DOCUMENTS

| 2020/0112072 A1* | 4/2020 | Schmitt ............. H01M 10/6556 |
| 2020/0130761 A1 | 4/2020 | Drabon et al. |
| 2022/0158297 A1* | 5/2022 | Tada ................... H01M 50/298 |

FOREIGN PATENT DOCUMENTS

| AT | 522361 B1 * | 10/2020 | ............. B29C 65/08 |
| DE | 102016103013 A1 | 8/2017 | |
| DE | 102017130557 A1 | 6/2019 | |

OTHER PUBLICATIONS

Clarivate Analytics machine translation of DE 102016103013 A1 (Year: 2017).*
Clarivate Analytics machine translation of DE 102017130557 A1 (Year: 2019).*

* cited by examiner

*Primary Examiner* — Kevin E Yoon
(74) *Attorney, Agent, or Firm* — Michael Best & Friedrich LLP

(57) ABSTRACT

A battery module having a plurality of battery cells and a first housing element (21) and a second housing element (22) is disclosed. The housing elements together form an interior space (9) in which the plurality of battery cells is accommodated, and are each formed from a metal material, the first housing element (21) having a projection (31) and the second housing element (22) having an indentation (32), the projection (31) engaging in the indentation (32). On a side facing away from the interior space, the first housing element (21) has a first weld region (41) and the second housing element (22) has a second weld region (42), the first weld region (41) and the second weld region (42) being connected to one another by welding.

10 Claims, 2 Drawing Sheets

BATTERY MODULE

BACKGROUND

The invention proceeds from a battery module according to the preamble of the independent claim.

It is known from the prior art that a battery module has a plurality of individual battery cells, each of which has a positive voltage tap and a negative voltage tap, with the various voltage taps being electrically conductively connected to one another for an electrically conductive connection, in series and/or parallel, of the plurality of battery cells to one another and thus being able to be interconnected to form the battery module. Battery modules, for their part, are interconnected to form batteries or entire battery systems.

SUMMARY

A battery module having the features of the independent claim offers the advantage that a reliable mechanical connection of a first housing element and a second housing element as well as a sealing of the battery module can be formed.

In accordance with the invention, a battery module having a plurality of battery cells is provided for this purpose. The battery module comprises a first housing element and a second housing element, which together form an interior space. The plurality of battery cells is accommodated in the interior space. Furthermore, the first housing element and the second housing element are each made of a metal material. The first housing element has a projection and the second housing element has an indentation, the projection engaging in the indentation. On a side facing away from the interior space, the first housing element has a first weld region and the second housing element has a second weld region. In this case, the first weld region and the second weld region are welded to one another in an integrally bonded manner.

Advantageous further developments and improvements of the device described in the independent claim are possible by the measures stated in the dependent claims.

In particular, in such a connection, the functions of mechanical strength and tightness are separated. In other words, this means that no seal welding is required. This offers the particular advantage that the welded integrally bonded connection only has to transfer mechanical loads and no weld seam of fluid-tight design has to be produced. The weld seam therefore only has to provide strength against mechanical stresses, such as those caused by loads during a crash. This can allow a simpler design overall. For example, in such cases where it is not possible to provide a circumferential weld seam, for example due to accessibility of the battery module, separation of the tightness and mechanical strength functions offers particular advantages. Furthermore, a local failure of the welded, integrally bonded connection would not lead to an immediate leakage of the battery module, so that, for example, local defects during production would not lead to a rejection of the corresponding battery module.

A sealing function located in an internally protected region of the battery module also offers the advantage that the battery module is less susceptible to corrosive external loads.

In particular, the integrally bonded connection of the first weld region and the second weld region also allows comparably high requirements to be met with regard to electromagnetic compatibility (EMC), since the first housing element and the second housing element can be permanently electrically contacted with one another.

Particularly preferably, the welding process is designed as a laser welding process.

According to a preferred aspect of the invention, the first housing element of the battery module and/or the second housing element of the battery module are each formed as a housing half, which is particularly preferably half-shell-shaped, i.e. has an opening on one side face and the remaining side faces are delimited by housing walls. The projection or indentation is preferably arranged around the corresponding opening. In particular, the projection or indentation is arranged directly adjacently to the corresponding opening.

Furthermore, the first weld region and the second weld region are also arranged directly adjacently on an outer side of the corresponding housing element to the corresponding opening. In particular, it is also possible that, for example, the second weld region forms part of the indentation or delimits it.

It is expedient if the projection and the indentation are designed as a tongue-and-groove system. This offers the particular advantage that further increased tightness can be achieved. In particular, regions which are not directly accessible to a welding process can also be made tight.

Particularly preferably, the first housing element and/or the second housing element are formed from aluminum. In particular, the first housing element and/or the second housing element are designed as die-cast components. It is advantageous to use a full vacuum mold or a vacuum-assisted die-casting mold here in order to be able to produce an almost pore-free cast structure for the welding process. The use of die-cast aluminum alloys for the first housing element and/or the second housing element in conjunction with an integrally bonded connection between the two housing elements can increase safety in the event of an accident, for example of a vehicle with a battery module according to the invention. In particular, the first housing element and the second housing element are formed in such a way that they can absorb part of the acting force in the event of an accident. This can be formed by the integrally bonded connection of the first weld region and the second weld region.

Expediently, a sealant is furthermore arranged between the projection and the indentation. This offers the particular advantage that further increased tightness can be achieved. In particular, regions which are not directly accessible to a welding process can also be made tight.

Particularly preferably, the sealant is designed as an adhesive and, in particular, as a structurally load-bearing adhesive. A structurally load-bearing adhesive can further increase the load that can be carried in the event of an accident, for example. In this way, a mechanically load-bearing sealant can significantly increase the strength in conjunction with the weld seam in a comparable manner, thereby counteracting any loads that occur and also increasing safety.

According to a preferred aspect of the invention, the first weld region is raised relative to the first housing element and/or the second weld region is raised relative to the second housing element. Such an elevation or elevations offers/offer the advantage that a so-called 'welding through' can be prevented during welding, since the welding depth is smaller than the extension of the elevation or elevations. The elevations are preferably selected here in such a way that welding through is prevented depending on the particular tolerances. Welding through could be problematic in such a case, for example, if the laser beam hits the sealant and the sealant is displaced as a result or, in the worst case, even evaporates.

Preferably, a weld seam is arranged peripherally on the battery module. This allows a reliable formation to be provided.

It is expedient that the first weld region and the second weld region each have recesses so that a plurality of weld seams is formed. These weld seams of the plurality of weld seams can be designed here in such a way that their entire length does not have to be formed in a load-bearing manner in order to provide sufficient strength. Thus, in particular, the beginning of such a weld seam and the end of such a weld seam would not have to contribute to mechanical load transfer. In other words, this means the weld seam can be welded along its entire length, but not the entire length serves to provide strength. In particular, local failure of the weld seam due to a mechanical load application does not result in immediate leakage. In addition, the EMC requirements are also met. The recesses can also save process time during the welding process. In particular, the length and arrangement of the recesses can be adapted to the particular requirements.

Overall, the invention enables a significantly more compact design, for example compared to screwed connections, since the welded, integrally bonded connection requires a comparably small installation space. In addition, such a connection cannot be undone non-destructively and thus at the same time provides reliable protection against tampering.

BRIEF DESCRIPTION OF THE DRAWINGS

Exemplary embodiments of the invention are shown in the drawings and explained in more detail in the following description.

The drawings show.

DETAILED DESCRIPTION

Figure 1:
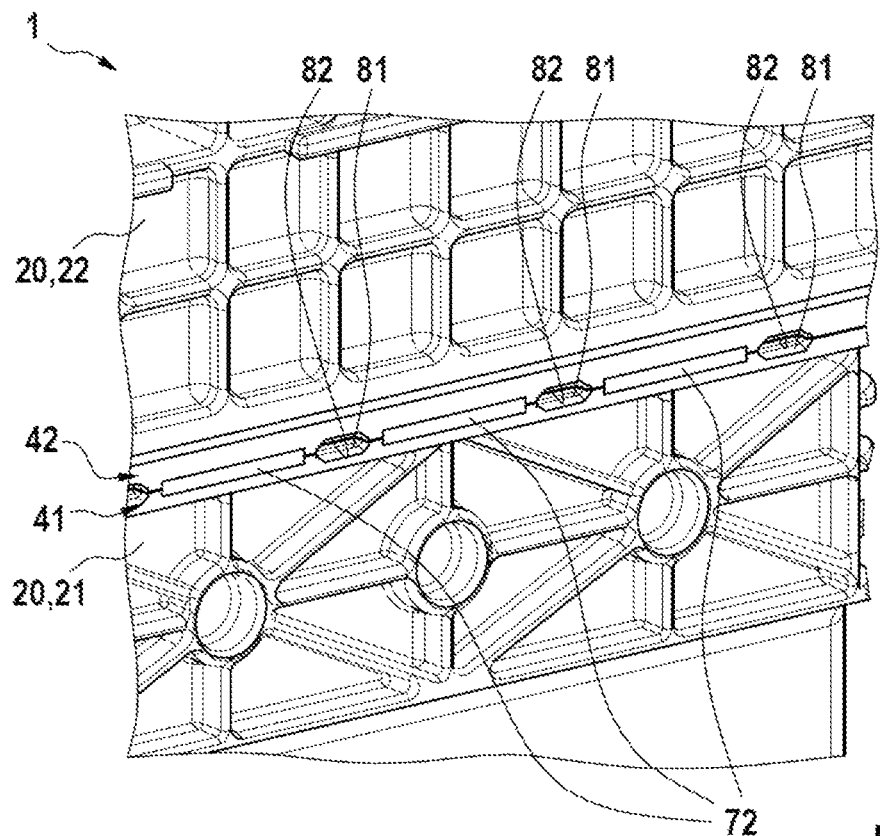
FIG. 1 a detail of a perspective view of a battery module according to the invention, FIG. 2 a perspective view of a first housing element of the battery module, FIG. 3 a perspective view of a second housing element of the battery module and FIG. 4 a sectional view of a battery module according to the invention with a laser weld seam.

FIG. 1 shows a section of a perspective view of a battery module 1 according to the invention.

The battery module 1 has a first housing element 21 and a second housing element 22, which together form an interior space 9 that cannot be seen in FIG. 1.

Furthermore, the first housing element 21 and the second housing element 22 are each made of a metal material, in particular aluminum. In addition, the first housing element 21 and the second housing element 22 are each formed as a die-cast component 20 according to the preferred embodiment shown in FIG. 1.

Figure 2:
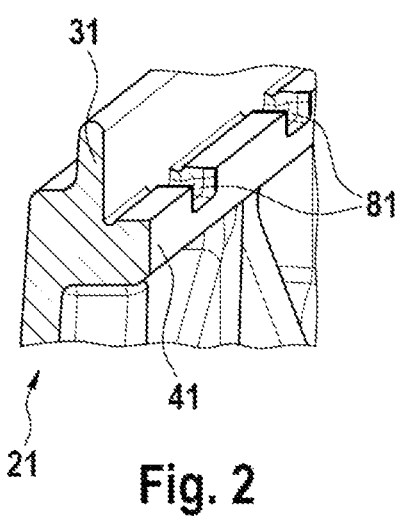
Figure 3:
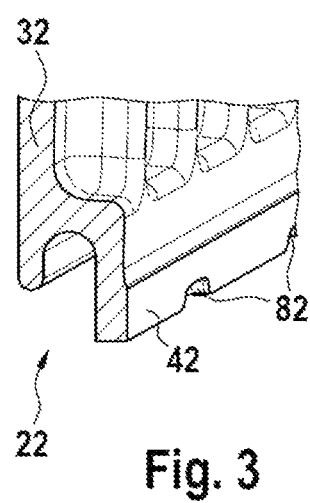

A first weld region 41 of the first housing element 21, described in more detail in FIG. 2, and a second weld region 42 of the second housing element 22, described in more detail in FIG. 3, are connected together in an integrally bonded manner by welding.

It can be seen here that the first weld region 41 has recesses 81 and that the second weld region 42 has recesses 82.

According to the embodiment of the battery module 1 shown in FIG. 1, a plurality of weld seams 72 are formed.

FIG. 2 shows a perspective view of a first housing element 21 of the battery module 1. The first housing element 21 comprises a projection 31. In particular, the projection 31 is designed to engage in an indentation 32 of the second housing element 22.

Furthermore, the first housing element 21 has a first weld region 41. It should be noted at this juncture that the first weld region 41 is particularly preferably arranged directly adjacent to the projection 31. The first weld region 41 is designed here to be connected to the second weld region 42 in an integrally bonded manner by welding.

Furthermore, it can be seen that the first weld region 41 has recesses 81.

At this juncture, it should be noted that the projection 31 according to this exemplary embodiment example is preferably designed as a tongue of a tongue-and-groove system.

FIG. 3 shows a perspective view of a second housing element 22 of the battery module 1. The second housing element 22 comprises an indentation 32. In particular, the indentation 32 is designed to accommodate a projection 31 of the first housing element 21.

Furthermore, the second housing element 22 has a second weld region 42. It should be noted at this juncture that the second weld region 42 is particularly preferably arranged directly adjacently to the indentation 32. The second weld region 42 is designed to be connected to the first weld region 41 in an integrally bonded manner by welding.

Furthermore, it can be seen that the second weld region 42 has recesses 82.

At this juncture, it should be noted that the indentation 32 according to this exemplary embodiment is preferably formed as a groove of a tongue-and-groove system.

Figure 4:
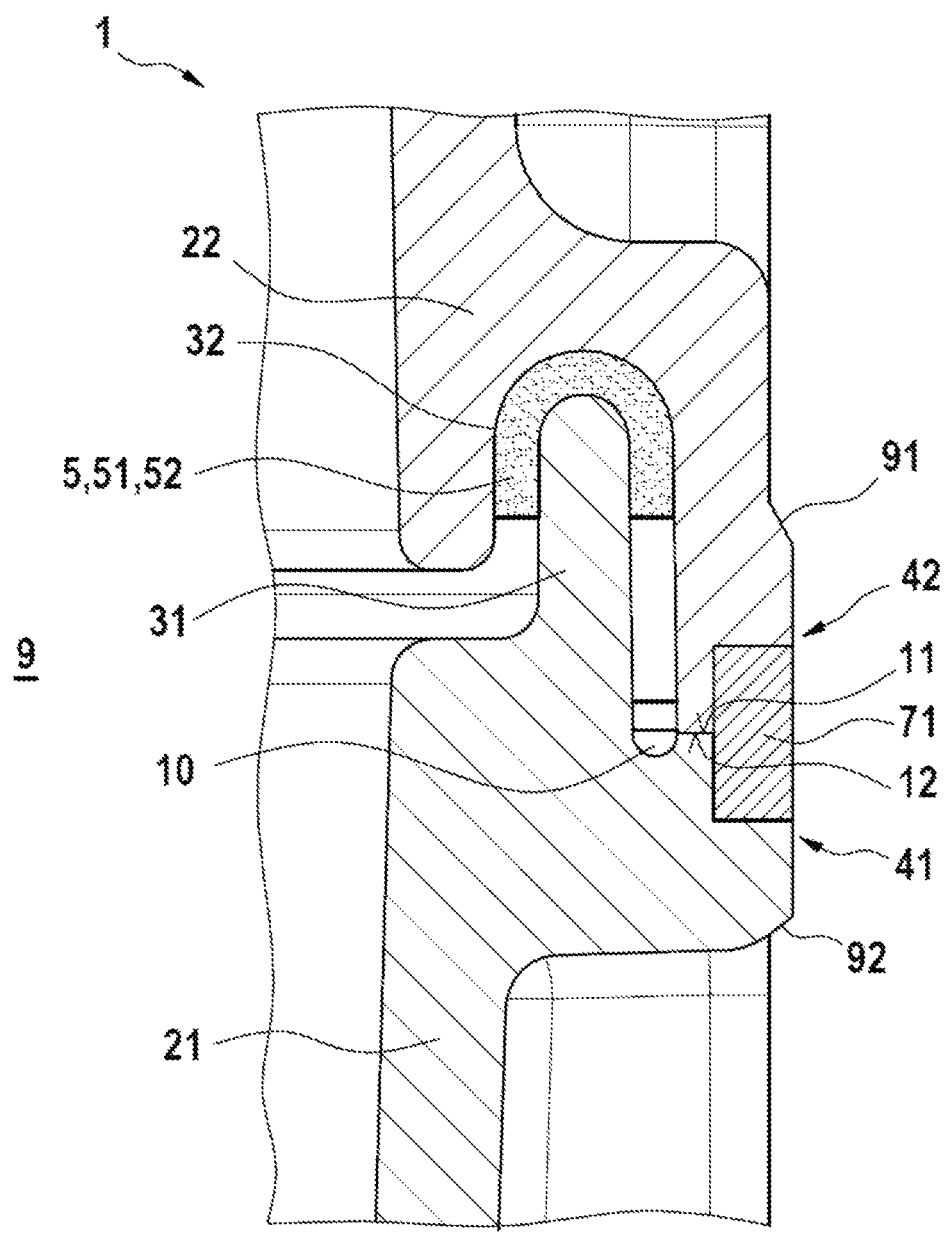

FIG. 4 shows a sectional view of a battery module 1 according to the invention with a laser weld seam 71.

Firstly, the first housing element 21 with the projection 31 and the second housing element 22 with the indentation 32 can be seen here. A sealant 5 is also arranged here between the projection 31 and the indentation 32.

In particular, the sealant 5 is thereby formed as an adhesive 51 and especially as a structurally load-bearing adhesive 52.

Furthermore, it can be seen that a weld seam 71, which can, for example, be arranged peripherally on the battery module 1, connects the first weld region 41 of the first housing element 21 and the second weld region 42 of the second housing element 22 in a welded, integrally bonded manner on a side of the battery module 1 facing away from the interior space 9. It should be noted at this juncture that the embodiment of FIG. 4 is not limited exclusively to a weld seam 71 arranged peripherally on the battery module 1, but a plurality of weld seams 72 can also be formed, as shown for example in FIG. 1.

The first weld region 41 is raised relative to the first housing element 21, and the second weld region 42 is raised relative to the second housing element 22.

Facing away from the weld seam 71, the first weld region 41 of the first housing element 21 has a chamfer 91 and the second weld region 42 of the second housing element 22 has a chamfer 92.

In order to be able to achieve tolerances required for the welding process, the unfinished component of the first housing element 21 or the second housing element 22 must be mechanically reworked in the region of the first weld region 41 and the second weld region 42. Both the side faces facing away from the interior space 9 and a first bearing face 11 of the first weld region 41 and a second bearing face 12 of the second weld region 42 should preferably be milled over in order to be able to achieve gaps necessary for laser welding, for example. The design as an elevation means that the corresponding faces are not damaged during the milling.

The chamfers 91 and 92 result in a comparably blunt edge, for example after mechanical processing of the unfinished component by milling. This has the advantage of minimizing the risk of injury during handling of the battery module.

In addition, the battery module 1 has a recess 10 immediately adjacent to the first bearing face 11 and the second bearing face 12. This serves to prevent the sealant 5 from reaching the first bearing face 11 or the second bearing face 12 in the event of an asymmetrical tolerance position of the projection 31 to the indentation 32. Since the sealant 5 is displaced into the indentation 32, carryover into the weld region is thus prevented.

Furthermore, the position of the weld seam 71 relative to the sealing region with the sealant 5 is selected in such a way that the amount of heat introduced during welding does not thermally stress the sealant 5 and thus possibly cause preliminary damage to it. Furthermore, this can result in the sealing region being protected by fluid entering the housing gap. This arrangement also minimizes the risk of corrosive infiltration of the seal.

At this juncture, it should be noted that the first bearing face 11 and the second bearing face 12 are arranged to make mechanical contact. As a result, the first housing element 21 and the second housing element 22 are additionally mechanically contacted in addition to the connection by means of the weld seam 71.

The invention claimed is:

1. A battery module having a plurality of battery cells and a first housing element (21) and a second housing element (22), which together form an interior space (9) in which the plurality of battery cells is accommodated, and which are each formed from a metal material,
the first housing element (21) having a projection (31) and the second housing element (22) having an indentation (32),
the projection (31) engaging in the indentation (32),
wherein
on a side facing away from the interior space,
the first housing element (21) has a first weld region (41), and
the second housing element (22) has a second weld region (42),
the first weld region (41) and the second weld region (42) being connected to one another in an integrally bonded manner by welding,
wherein the first weld region (41) and/or the second weld region (42) have recesses (81, 82) so that a plurality of weld seams (72) is formed.

2. The battery module according to claim 1, wherein the projection (31) and the indentation (32) are formed as a tongue-and-groove system.

3. The battery module according to claim 1, wherein the first housing element (21) and/or the second housing element (22) are formed from aluminum.

4. The battery module according to claim 3, wherein the first housing element (21) and/or the second housing element (22) are formed as a die-cast component (20).

5. The battery module according to claim 1, wherein a sealant (5) is further disposed between the projection (31) and the indentation (32).

6. The battery module according to claim 5, wherein the sealant (5) is formed as an adhesive (51).

7. The battery module according to claim 6, wherein the adhesive (51) is a structurally load-bearing adhesive (52).

8. The battery module according to claim 1, wherein the first weld region (41) is raised with respect to the first housing element (21) and/or the second weld region (42) is raised with respect to the second housing element (22).

9. The battery module according to claim 1, wherein the plurality of weld seams (72) includes a weld seam (71) arranged circumferentially on the battery module (1).

10. The battery module according to claim 1, wherein the plurality of weld seams (72) is arranged circumferentially on the battery module (1).

* * * * *